United States Patent
Funkhouser

(10) Patent No.: US 7,066,262 B2
(45) Date of Patent: Jun. 27, 2006

(54) GELLED LIQUID HYDROCARBON TREATMENT FLUIDS HAVING REDUCED PHOSPHORUS VOLATILITY AND THEIR ASSOCIATED METHODS OF USE AND PREPARATION

(75) Inventor: Gary P. Funkhouser, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 22 days.

(21) Appl. No.: 10/920,821

(22) Filed: Aug. 18, 2004

(65) Prior Publication Data

US 2006/0037754 A1    Feb. 23, 2006

(51) Int. Cl.
*E21B 43/27* (2006.01)

(52) U.S. Cl. ............... 166/300; 166/280.2; 166/308.4

(58) Field of Classification Search ............... None
See application file for complete search history.

(56) References Cited

U.S. PATENT DOCUMENTS

| | | | |
|---|---|---|---|
| 4,003,393 A | 1/1977 | Jaggard et al. | |
| 4,473,408 A | 9/1984 | Purinton, Jr. | |
| 4,622,155 A | 11/1986 | Harris et al. | |
| 5,034,139 A | 7/1991 | Reid et al. | |
| 5,271,464 A | 12/1993 | McCabe | |
| 5,310,002 A * | 5/1994 | Blauch et al. | 166/307 |
| 5,846,915 A | 12/1998 | Smith et al. | |
| 6,283,215 B1 | 9/2001 | Kohler et al. | |
| 6,511,944 B1 * | 1/2003 | Taylor et al. | 507/237 |
| 6,516,861 B1 * | 2/2003 | Allen | 166/351 |
| 6,719,053 B1 * | 4/2004 | Thompson | 166/305.1 |
| 2002/0165101 A1 * | 11/2002 | Taylor et al. | 507/200 |

OTHER PUBLICATIONS

Hochwalt et al., "Alkyl Esters of Phosphoric Acid," IND and ENG'G Chemistry, vol. 34, at 20 (1942).

* cited by examiner

*Primary Examiner*—Zakiya W. Bates
(74) *Attorney, Agent, or Firm*—Robert A. Kent; Baker Botts

(57) ABSTRACT

This invention relates to reduced volatility gelled liquid hydrocarbon treatment fluids and methods of their use and preparation. In one embodiment, this invention provides a method of treating a portion of a subterranean formation comprising: providing a reduced volatility gelled liquid hydrocarbon treatment fluid that comprises a liquid hydrocarbon and a gelling agent that comprises a polyvalent metal salt of a phosphoric acid ester, and treating the portion of the subterranean formation with the reduced volatility gelled liquid hydrocarbon treatment fluid. In another embodiment, this invention provides a gelled liquid hydrocarbon treatment fluid: that comprises a liquid hydrocarbon and a gelling agent that comprises a polyvalent metal salt of a phosphoric acid ester; that has a concentration of less than about 250 mg/liter of trialkyl phosphate esters that have a molecular weight of less than about 350; and that has a diester-to-monoester content molar ratio of at least about 2:1.

106 Claims, No Drawings

GELLED LIQUID HYDROCARBON TREATMENT FLUIDS HAVING REDUCED PHOSPHORUS VOLATILITY AND THEIR ASSOCIATED METHODS OF USE AND PREPARATION

BACKGROUND OF THE INVENTION

This invention relates to reduced volatility gelled liquid hydrocarbon treatment fluids and methods of their use and preparation.

Gelled liquid hydrocarbon fluids have been utilized in treating subterranean formations penetrated by well bores, e.g., for stimulation or sand control treatments such as fracturing or gravel packing, respectively. In fracturing treatments, a gelled liquid hydrocarbon fracturing fluid that may comprise particulates, often referred to as proppant, suspended therein is pumped through a well bore into a subterranean formation at a rate and pressure such that one or more fractures are formed or enhanced in a portion of the formation. Proppant particulates may be deposited in the fractures, inter alia, to prevent the formed fractures from closing, thereby maintaining conductive channels through which produced fluids can flow to the well bore. At a desired time, the viscosity of the gelled liquid hydrocarbon fluid may be reduced, or "broken," and the fluid may be recovered.

Similarly, sand control operations, such as gravel packing, use gelled liquid hydrocarbon fluids, often referred to as gravel pack fluids. Gravel pack fluids usually are used to suspend gravel particulates for delivery to a desired area in a well bore, e.g., near unconsolidated or weakly consolidated formation particulates, to form a gravel pack to enhance sand control. One common type of gravel packing operation involves placing a gravel pack screen in the well bore and packing the annulus between the screen and the well bore with gravel of a specific size designed to prevent the passage of formation sand. The gravel, inter alia, acts to prevent the particulates from occluding the screen or migrating with the produced fluids, and the screen, inter alia, acts to prevent the gravel from entering the production tubing. Once the gravel pack is substantially in place, the viscosity of the gravel pack fluid often is reduced to allow it to be recovered or produced back from the well bore.

Polyvalent metal salts of orthophosphoric acid esters have been utilized as gelling agents for forming high-viscosity gelled liquid hydrocarbon treatment fluids. Such gelled liquid hydrocarbon treatment fluids often have included particulate materials such as proppant or gravel, and oftentimes delayed breakers for causing the treatment fluids to break into relatively thin fluids so that the treatment fluids may be produced back. Descriptions of such high-viscosity gelled liquid hydrocarbon treatment fluids and methods of their use are set forth at least in part in U.S. Pat. No. 4,622,155 issued to Harris et al. on Nov. 11, 1986, and U.S. Pat. No. 5,846,915 issued to Smith et al. on Dec. 8, 1998.

While high-viscosity gelled liquid hydrocarbon treatment fluids and methods have been used successfully in some instances, problems in downstream processes have been encountered as a result of the use of certain phosphoric acid ester gelling agents. For example, plugging of refinery towers (which often process hydrocarbons produced from formations treated with gelled liquid hydrocarbon fracturing fluids) has caused many expensive, unplanned shut-downs of those towers. The plugging material is high in phosphorus and has been attributed to the phosphoric acid esters used as gelling agents in conventional reduced volatility gelled liquid hydrocarbon treatment fluids used during production of the hydrocarbons from a subterranean formation. The phosphoric acid esters are thought to contribute volatile phosphorus, which may condense on distillation tower trays, resulting in plugging of such trays, which may result in shut-downs of the towers. The volatile phosphorus also may carry over the tops of the distillation towers causing contamination of the hydrocarbon products produced. This volatile phosphorus problem has been attributed to the alleged inherent lack of stability of phosphate esters, which are believed to hydrolyze to form lower molecular weight compounds that are generally thought to cause the fouling problems. Despite these volatility and fouling problems, phosphoric acid ester gelling agents are desirable in that they are relatively low cost as compared to other hydrocarbon gelling agents. Thus, if a phosphoric acid ester gelling agent could be designed that did not have these associated volatility problems, this would be highly desirable.

SUMMARY OF THE INVENTION

This invention relates to reduced volatility gelled liquid hydrocarbon treatment fluids and methods of their use and preparation.

In one embodiment, the present invention provides a method of treating a portion of a subterranean formation comprising: providing a reduced volatility gelled liquid hydrocarbon treatment fluid that comprises a liquid hydrocarbon and a gelling agent that comprises a polyvalent metal salt of a phosphoric acid ester, and treating the portion of the subterranean formation with the reduced volatility gelled liquid hydrocarbon treatment fluid.

In another embodiment, the present invention provides a method of fracturing a portion of a subterranean formation comprising: providing a reduced volatility gelled liquid hydrocarbon treatment fluid that comprises a liquid hydrocarbon and a gelling agent that comprises a polyvalent metal salt of a phosphoric acid ester, and contacting the portion of the subterranean formation with the gelled liquid hydrocarbon treatment fluid under conditions effective to create or enhance at least one fracture in the subterranean formation.

In another embodiment, the present invention provides a method of providing sand control to a portion of a subterranean formation comprising: providing a reduced volatility gelled liquid hydrocarbon treatment fluid that comprises gravel particulates and a gelling agent that comprises a polyvalent metal salt of a phosphoric acid ester; and contacting the portion of the subterranean formation with the reduced volatility gelled liquid hydrocarbon treatment fluid so as to form a gravel pack near a portion of the subterranean formation.

In another embodiment, the present invention provides a method of preparing a reduced volatility gelled liquid hydrocarbon treatment fluid comprising the step of: adding a polyvalent metal salt of a phosphoric acid ester to a liquid hydrocarbon; and allowing a reduced volatility gelled liquid hydrocarbon treatment fluid to form.

In another embodiment, the present invention provides a method of preparing a reduced volatility gelled liquid hydrocarbon treatment fluid comprising the steps of: adding to a liquid hydrocarbon a phosphoric acid ester having the formula:

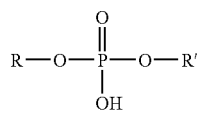

wherein R or R' comprises a hydrocarbon group having about 1 to about 30 carbon atoms, and R or R' comprises a hydrocarbon group having from about 1 to about 6 carbon atoms; adding an activator composition comprising a source of polyvalent metal ions that react with the phosphoric acid ester to form a polyvalent metal salt of the phosphoric acid ester; and allowing the liquid hydrocarbon to gel to form a reduced volatility gelled liquid hydrocarbon treatment fluid.

In another embodiment, the present invention provides a gelled liquid hydrocarbon treatment fluid: that comprises a liquid hydrocarbon and a gelling agent that comprises a polyvalent metal salt of a phosphoric acid ester; that has a concentration of less than about 250 mg/liter of trialkyl phosphate esters that have a molecular weight of less than 350; and that has a diester-to-monoester content molar ratio of at least about 2:1.

Other features and advantages of the present invention will be readily apparent to those skilled in the art upon a reading of the description of preferred embodiments which follows.

DESCRIPTION OF PREFERRED EMBODIMENTS

This invention relates to reduced volatility gelled liquid hydrocarbon treatment fluids and methods of their use and preparation.

When conventional phosphoric acid ester gelling agents are manufactured, they contain certain amounts of monoesters and diesters of orthophosphoric acids. See Hochwalt et al., *Alkyl Esters of Phosphoric Acid*, IND. AND ENG'G CHEMISTRY, Vol. 34, at 20 (1942). These diesters are desirable, in that they are useful for gelling liquid hydrocarbons. The monoesters, on the other hand, are not useful for gelling liquid hydrocarbons and may be problematic. Conventional phosphoric acid ester gelling agents have proven to have very little utility for gelling liquid hydrocarbons due to their high monoester concentrations. To counteract the potential problems presented by the monoesters, over the last thirty years or so, trialkyl phosphates (e.g., triethyl phosphate) have been included to improve the yield of the diesters. See U.S. Pat. No. 4,537,700, regarding, inter alia, a discussion of the addition of triethyl phosphate to improve the yield of the diesters.

In this invention, it has been recognized that residual trialkyl phosphates, such as triethyl phosphate, may actually be the source of the volatility problems in downstream processing operations that are commonly associated with conventional phosphoric acid ester gelling agents (as opposed to the general wisdom that the volatility problems are associated with their alleged lack of stability). Residual trialkyl phosphates are problematic because of their vapor pressure, which allows them to vaporize at the temperatures used in downstream processes, which can lead to fouling. The following table helps illustrate this point.

TABLE 1

Trialkyl Phosphate Ester Boiling Points and Molecular Weights

| Trialkyl Phosphate Ester | MW | BP, (° C.) |
|---|---|---|
| Trimethyl phosphate | 140.1 | 197 |
| Triethyl phosphate | 182.2 | 215 |
| Tripropyl phosphate | 224.3 | 254 |
| Tributyl phosphate | 266.4 | 288 |
| Decyl diethyl phosphate | 294.4 | 310 |
| Trihexyl phosphate | 350.5 | 354 |

Another factor affecting their problem-causing potential is their inability to form salts. Trialkyl phosphates that have a molecular weight of about 350 or greater should not present these problems because, inter alia, their vapor pressure is sufficiently low and their boiling point is sufficiently high that they will not pose fouling risks to downstream processes. Therefore, by minimizing the concentration of lower molecular weight trialkyl phosphates (i.e., those having a molecular weight of less than about 350) in the phosphoric acid ester gelling agents of this invention, one can minimize the volatility risks and problems associated with conventional phosphoric acid ester gelling agents. The gelled liquid hydrocarbon treatment fluids of this invention have a concentration of less than about 250 mg/liter of trialkyl phosphate esters that having a molecular weight of less than about 350. The gelled liquid hydrocarbon treatment fluids of this invention also have a diester to monoester content molar ratio of at least about 2:1. The term "reduced volatility gelled liquid hydrocarbon treatment fluid" as used herein is intended to refer to these gelled liquid hydrocarbon treatment fluids, i.e., those having a concentration of less than about 250 mg/liter of trialkyl phosphate esters that have a molecular weight of less than about 350, and having a diester to monoester content molar ratio of at least about 2:1. In certain preferred embodiments, the reduced volatility gelled liquid hydrocarbon treatment fluids of the present invention have a concentration of less than about 100 mg/liter of trialkyl phosphate esters that have a molecular weight of less than about 350; in other embodiments, the reduced volatility gelled liquid hydrocarbon treatment fluids have concentration of less than about 50 mg/liter of trialkyl phosphate esters that have a molecular weight of less than about 350. It should be noted that the trialkyl phosphate ester concentration in a treatment fluid may vary depending on the amount of the phosphoric acid ester gelling agent used. One should be mindful that enough gelling agent should be used to achieve an adequately gelled reduced volatility gelled liquid hydrocarbon treatment fluid that is useful in subterranean applications that also has a sufficiently low concentration of trialkyl phosphate esters, e.g., less than about 250 mg/liter.

The reduced volatility gelled liquid hydrocarbon treatment fluids of the present invention are suitable for use in subterranean treatment operations, such as subterranean stimulation and sand control treatments, such as fracturing and gravel packing that may be carried out in subterranean formations. The compositions and methods of the present invention also may be suitable, for example, to be used as plugging agents, well bore cleanup fluids, viscous sweep fluids, or insulating fluids to be used in associated methods.

The reduced volatility gelled liquid hydrocarbon treatment fluids of the present invention comprise a gelling agent that comprises a polyvalent metal salt of a phosphoric acid ester. The term "salt" as used herein and in related applications refers to polyvalent metal ion salts that can be formed directly from a phosphoric acid ester. Suitable phosphoric acid esters have the formula:

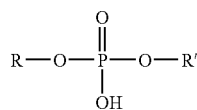

wherein R comprises a hydrocarbon group having from about 1 to about 30 carbon atoms that, for example, may comprise a linear or branched alkyl, alkenyl, aryl, alkylaryl, arylalkyl, cycloalkyl, alkyl ether, aryl ether, alkyl aryl ether, or a mixture thereof; and R' comprises a hydrocarbon group having from about 1 to about 6 carbon atoms. If R is a relatively small group, then R' may comprise a larger hydrocarbon group similar to that listed above with respect to R such as linear or branched alkyl, alkenyl, aryl, alkylaryl, arylalkyl, cycloalkyl, alkyl ether, aryl ether, alkyl aryl ether group, or a mixture thereof that may have about 1 to about 30 carbon atoms. In choosing a suitable R and R', one should be mindful that if R and R' are both relatively bulky groups (e.g., if R and R' are both 2-ethylhexyl groups), then an adequate reduced volatility gelled liquid hydrocarbon treatment fluid may not form.

Suitable polyvalent metal ions may be made available from suitable activator compositions. Suitable activator compositions comprise a source of polyvalent metal ions suitable for forming the polyvalent metal salts of phosphoric acid esters of the gelling agents of the present invention. Examples of such suitable ions include, but are not limited to, aluminum ions, gallium ions, lanthanum ions, ruthenium ions, iron ions, or lanthanide rare earth series ions. Preferred polyvalent metal ions have a +3 oxidation state. When ferric iron is utilized to form a gelling agent, the source of the ions is preferably ferric sulfate or ferric chloride, ferric sulfate being preferred. The ferric iron salt is typically mixed with amines, surfactants and water to form a liquid activator composition. An example of a commercially available ferric iron activator composition is "EA-3™" sold by Ethox Chemicals, Inc. of Greenville, S.C. When an aluminum compound is utilized, it is preferably selected from aluminum chloride, sodium aluminate, or aluminum isopropoxide. In certain embodiments, the molar ratio of metal to phosphorus in a reduced volatility gelled liquid hydrocarbon treatment fluid of this invention could be from about 1:3 to about 2:3. Suitable activator compositions also may comprise amines, surfactants, water, or other suitable components.

The phosphoric acid esters used in conjunction with the compositions and methods of this invention preferably should have a concentration of less than about 250 mg/liter of trialkyl phosphates that have a molecular weight of less than about 350. To reduce the concentration of any such lower molecular weight trialkyl phosphates in the phosphoric acid esters (and therefore reduce the volatility problems associated therewith), there are at least two methods available, for example, substituting another compound for the trialkyl phosphates during the manufacturing process or removing the trialkyl phosphates from the phosphoric acid esters. One method of ensuring that the phosphoric acid esters have a suitable volatile trialkyl phosphate concentration involves manufacturing the phosphoric acid esters without adding any lower molecular weight trialkyl phosphates (e.g., triethyl phosphate), and using a trialkyl phosphate ester having a molecular weight of about 350 or greater instead. By substituting a less volatile trialkyl phosphate ester in the manufacturing process, there will be a sufficiently low concentration of lower molecular weight trialkyl phosphate esters in the phosphoric acid ester. In selecting a suitable trialkyl phosphate ester, one should be mindful to choose one that has a molecular weight of greater than about 350 and a suitable boiling point so that it will not present volatility problems for downstream processes. A second method of ensuring that the phosphoric acid esters do not have a concentration of more than about 250 mg/liter of trialkyl phosphates that have a molecular weight of less than about 350 involves removing such trialkyl phosphates from the phosphoric acid esters, e.g., by reduced-pressure distillation. The substitution and removal methods can be used in conjunction, if desired.

The polyvalent metal salts of phosphoric acid esters of the gelling agents of the present invention may be formed by any suitable method, which will be known to those ordinarily skilled in the art.

The liquid hydrocarbon utilized to form the reduced volatility gelled liquid hydrocarbon treatment fluids of the present invention can comprise any suitable liquid hydrocarbon including, but not limited to, α-olefins, internal olefins, alkanes, aromatic solvents, cycloalkanes, liquefied petroleum gas, kerosene, diesel oil, gas oil (also known as gas condensate), fuel oil, other petroleum distillates, certain mixtures of crude oil, or mixtures thereof. Liquid hydrocarbons that may be specifically designed for use with $CO_2$ are generally preferred in some instances, e.g., a dry gas well. An example of a suitable liquid hydrocarbon is commercially available from the Trysol Corporation of Sundre, Alberta, Canada under the trade name "FRACSOL™."

If desired, enhancers may be added, inter alia, to provide alkalinity, improve the stability of the polyvalent metal ions in the activator composition, and/or improve the dispersability of the metal ions in the hydrocarbon liquid so as to facilitate the formation of the reduced volatility gelled liquid hydrocarbon treatment fluid. Preferred enhancers should provide alkalinity and should facilitate the gelation of the liquid hydrocarbon. Suitable enhancers may be defined by the general formula $C_nH_mO_xN_y$, wherein n is from about 1 to about 50, m is from about 0 to about the number of hydrogens necessary to satisfy the valence requirements of the enhancer compound, x is from about 1 to about 10 (preferably around 2), and y is from about 0 to about 10 (preferably under about 3). Suitable examples would be where the molar ratio of C to N in the enhancer ranges from about 1:1 to about 50:1, and C to 0 from about 1:1 to about 20:1. Specific examples include ethoxylated amines, like triethanolamines, N,N-dibutyl ethanol amines, and oxyalkylated di-$C_2$–$C_8$ alkyl amines; N,N-di-loweralkyl fatty amines; oxyalkylated fatty amine monoammonium citrate; bis(hydroxyethyl)tallowamine; and ethoxylated dehydroabietylamine. Mixtures of such suitable enhancers also are suitable. An example of a suitable enhancer is a surfactant. Surfactants may be added to facilitate the formation of a reduced volatility gelled liquid hydrocarbon treatment fluid. Surfactants may decrease the gelation time of the gelled liquid hydrocarbon because they may allow for a better dispersion of the metal ions in the hydrocarbon fluid. Suitable surfactants that may be used include basic surfactants, especially those that may comprise an amine group. Use of about 0.1% to about 10.0% of a suitable surfactant based on the amount of the gelling agent may be beneficial, inter alia, to help speed formation of the gelled liquid hydrocarbon fluid or to impart desirable rheological characteristics. Some specific examples of suitable surfactants include imidazoline, a fatty acid soap, a fatty acid, dioctyl sulphosuccinate, sodium alkyl benzene sulphonate, fatty acid esters, fatty acid alkanolamides, and amido betaines.

In certain embodiments, the reduced volatility gelled liquid hydrocarbon treatment fluids of the present invention may comprise particulate materials like proppant or gravel that can be utilized in, for example, fracturing or gravel packing operations. Suitable particulate materials include, but are not limited to, graded walnut or other nut shells, resin-coated walnut or other nut shells, graded sand, resin-coated sand, sintered bauxite, various particulate ceramic materials, glass beads, various particulate polymeric materials, and the like. The particular size of the particulate material employed may depend on the particular application for which the particulate materials are being used, characteristics of the subterranean formation, characteristics of the particular reduced volatility gelled liquid hydrocarbon treatment fluid being used, as well as other variables. Generally, the sizes of suitable particulates may vary in the range of from about 2 to about 200 mesh, U.S. Sieve Series scale. One of ordinary skill in the art with the benefit of this disclosure will be able to choose an appropriate particulate material for a given application.

In addition, in a preferred embodiment, if water is not already contained in the hydrocarbon liquid, or added thereto as a component of a component, e.g., in an activator composition or an enhancer, water may be added in an amount, for example, of about 0.05% or greater by the total treatment fluid volume. The presence of the water, inter alia, may be used beneficially in the compositions and methods of the present invention, for example, to allow for slowly water soluble or encapsulated breakers to be dissolved or released that may be used to reduce the viscosity of the reduced volatility gelled liquid hydrocarbon treatment fluid when desired. See, for example, Smith et al. U.S. Pat. No. 5,846,915 issued on Dec. 8, 1995, the relevant disclosure of which is incorporated herein by reference.

If a reduced volatility gelled liquid hydrocarbon treatment fluid of the present invention is being used in an application wherein it may be desirable to eventually reduce the viscosity of the treatment fluid, for example, to recover it from the subterranean formation at a desired time, then a suitable breaker may be included in or added to the fluid. Any breaker that is able to reduce the viscosity of the reduced volatility gelled liquid hydrocarbon treatment fluid when desired is suitable for use in the compositions and methods of the present invention. In certain preferred embodiments, delayed gel breakers that will react with the treatment fluid after a desired delay period may be used. Suitable delayed gel breakers can be materials that are slowly soluble in water, those that are encapsulated, or those that are otherwise designed to slowly solubilize in the fluid. In certain preferred embodiments wherein these types of breakers are used, the breaking of the gel does not take place until the slowly soluble breakers are at least partially dissolved in the water. Examples of such slowly soluble breakers are given in U.S. Pat. No. 5,846,915 issued to Smith et al. on Dec. 8, 1998. Hard-burned magnesium oxide, especially that having a particle size which will pass through a 200 mesh Tyler screen, is a preferred delayed gel breaker. Other breakers such as alkali metal carbonates, alkali metal bicarbonates, alkali metal acetates, other alkaline earth metal oxides, alkali metal hydroxides, amines, weak acids and the like can be encapsulated with slowly water soluble or other similar encapsulating materials so as to make them act after a desired delay period. Such materials are well known to those skilled in the art and function to delay the breaking of the gelled liquid hydrocarbon for a required period of time. Examples of water soluble and other similar encapsulating materials that may be suitable include, but are not limited to, porous solid materials such as precipitated silica, elastomers, polyvinylidene chloride (PVDC), nylon, waxes, polyurethanes, polyesters, cross-linked partially hydrolyzed acrylics and the like. Of the slowly soluble or encapsulated breakers mentioned, hard-burned magnesium oxide, which may be commercially available from Clearwater Inc. of Pittsburgh, Pa., is preferred. If used, the delayed gel breaker may be present in the gelled hydrocarbon liquids of the present invention in an amount in the range of from about 0.01% to about 3% w/v, more preferably in an amount in the range of from about 0.05% to about 1% w/v. "w/v" as used herein refers to the weight of the component based on the volume of the liquid hydrocarbon that is present in the treatment fluid.

Another type of breaker which can be utilized when the gelling agent is a ferric iron polyvalent metal salt of phosphoric acid ester is a reducing agent that reduces ferric iron to ferrous iron. Of the various oxidation states of iron, ferric iron is capable of forming a viscosifying coordination salt with a phosphoric acid ester, therefore the salt may be disassociated by reducing the ferric iron to the ferrous state. The disassociation may cause the reduced volatility gelled liquid hydrocarbon treatment fluid to break. Examples of reducing agents which can be utilized include, but are not limited to, stannous chloride, thioglycolic acid, hydrazine sulfate, sodium diethyldithiocarbamate, sodium dimethyldithiocarbamate, sodium hypophosphite, potassium iodide, hydroxylamine hydrochloride, 2-mercaptoethanol, ascorbic acid, sodium thiosulfate, sodium dithionite, and sodium sulfite. Of these, the preferred reducing agents for use at a temperature of about 90° F. are stannous chloride, thioglycolic acid, hydrazine sulfate, sodium diethyldithiocarbamate, and sodium dimethyldithiocarbamate. The most preferred reducing agent is thioglycolic acid, which may be delayed by salt formation or encapsulation. As mentioned above in connection with other breakers that can be used, the reducing agent utilized also can be delayed by encapsulating it with a slowly water soluble or other similar encapsulating material. If used, the gel breaker is generally present therein in an amount in the range of from about 0.01% to about 3% w/v, more preferably in an amount in the range of from about 0.05% to about 1% w/v.

Reduced volatility gelled liquid hydrocarbon treatment fluids of the present invention may be prepared by any suitable method. For instance, a reduced volatility gelled liquid hydrocarbon treatment fluid comprising a gelling agent that comprises a polyvalent metal salt phosphoric acid ester may be produced at the well site. In an example of such an on-site method, a phosphoric acid ester may be added to a suitable amount of an activator composition that comprises a source of polyvalent metal ions so as to form a gelling agent comprising polyvalent metal salt of a phosphoric acid ester. This may be done in a liquid hydrocarbon fluid so that the resultant gelling agent may gel the liquid hydrocarbon fluid. In certain embodiments, the molar ratio of metal to phosphorus in the reduced volatility gelled liquid hydrocarbon treatment fluid could range from about 1:3 to about 2:3.

A gelling agent of the present invention that comprises a polyvalent metal salt of a phosphoric acid ester may be formed off-site and then added to the liquid hydrocarbon at the well site so as to form a reduced volatility gelled liquid hydrocarbon treatment fluid. In an example of such a method, the polyvalent metal salt may be prepared by any method that is suitable for forming solid salt particulates (e.g., flakes, pellets, or other particulates) that later can be introduced to a liquid hydrocarbon fluid. The polyvalent metal salt particulates may be transported to the well site where they can be added to a liquid hydrocarbon fluid. In some embodiments of such methods, the liquid hydrocarbon fluid may be pre-gelled or partially gelled using any suitable technique. In one embodiment of such a technique, after the salt particulates are added to the liquid hydrocarbon fluid, no significant increase in the viscosity of the liquid hydrocarbon fluid may be realized until the temperature of the fluid is sufficient to enable the salt particulates to dissolve in the liquid hydrocarbon fluid to eventually increase its viscosity.

Another method of preparing a reduced volatility gelled liquid hydrocarbon treatment fluid of the present invention comprises forming an initial liquid hydrocarbon gel by adding a gelling agent that comprises a polyvalent metal salt of a phosphoric acid ester to a liquid hydrocarbon fluid to form an initial gel. At a desired time, an additional quantity of a gelling agent that may comprise a polyvalent metal salt of a phosphoric acid ester may be added to the initial gel, for example, as it is pumped into a well bore penetrating a subterranean formation, to form a more viscous gel.

Another example of a method for forming the reduced volatility gelled liquid hydrocarbon treatment fluids of the present invention involves preparing a liquid hydrocarbon gel having a high concentration of a polyvalent metal salt of a phosphoric acid ester. This gel may be highly viscous. This highly viscous gel may be prepared off-site and then delivered to the location of use at a desired time. At the location, the highly viscous gel may be diluted with a hydrocarbon if desired for use (for instance, if the gel is to be used in a fracturing or sand control treatment method).

Although certain methodologies of making a reduced volatility gelled liquid hydrocarbon treatment fluid of the present invention have been discussed in detail, one should note that the order of addition of each component is not critical, and therefore, other methods are suitable as well.

In a reduced volatility gelled liquid hydrocarbon treatment fluid embodiment, a gelling agent comprising a phosphoric acid ester may be added to the liquid hydrocarbon along with an activator composition that comprises a source of polyvalent metal ions to for a reduced volatility gelled liquid hydrocarbon treatment fluid.

An exemplary method of the present invention of treating a subterranean formation comprises the steps of: providing a reduced volatility gelled liquid hydrocarbon treatment fluid comprising a gelling agent that comprises a polyvalent metal salt of a phosphoric acid ester, and treating the subterranean formation with the reduced volatility gelled liquid hydrocarbon treatment fluid. Treating the subterranean formation may involve fracturing the subterranean formation, performing a sand control treatment (e.g., gravel packing), providing a plugging agent (e.g., pill), providing a well bore cleanup fluid, performing a viscous sweep, or providing an insulating fluid. U.S. Pat. No. 5,271,464 assigned to Halliburton Company, the relevant disclosure of which is incorporated by reference, describes providing a plugging agent with a gel. U.S. Pat. Nos. 4,473,408 and 4,003,393, both assigned to The Dow Chemical Company, the relevant disclosures of which are incorporated by reference, describe the use of organic gels for cleaning the interior of a pipeline. U.S. Pat. No. 5,034,139 assigned to Nalco Chemical Company, the relevant disclosure of which is incorporated by reference, describes the use of a thixotropic gel as a viscous sweep. U.S. Pat. No. 6,283,215 assigned to Institut Francais Du Petrole, the relevant disclosure of which is incorporated by reference, describes insulation of tubings placed in a well bore. In certain of such embodiments, the gelling agent that comprises a polyvalent metal salt of the phosphoric acid ester may be present in the treatment fluid in an amount in the range of from about 0.1% to about 10.0% w/v.

In a reduced volatility fracturing treatment fluid embodiment, a gelling agent comprising a polyvalent metal salt of a phosphoric acid ester may be added to the liquid hydrocarbon along with an activator composition that comprises a source of polyvalent metal ions to gel the liquid hydrocarbon. In certain embodiments, the polyvalent metal salt of the phosphoric acid ester may be added in an amount in the range of from about 0.1% to about 10% w/v. Optionally, a fracturing fluid of the present invention may comprise water and/or a base to achieve a desired gel. A fracturing fluid of the present invention also may comprise proppant. In certain embodiments, the gelling agent may be present in the treatment fluid in an amount in the range of from about 0.1% to about 5.0% w/v, more preferably in an amount in the range of from about 0.2% to about 2.5% w/v. In certain embodiments, the reduced volatility gelled liquid hydrocarbon treatment fluid may comprise a proppant material. In certain embodiments, the proppant particulates may be present in the fluid in an amount in the range of from about 1 to about 32 pounds of proppant particulates per gallon of liquid hydrocarbon, more preferably in the range of about 1 to about 22 pounds per gallon. As mentioned, if desired, water may be added if not otherwise present in the reduced volatility gelled liquid hydrocarbon treatment fluid, so that, e.g., a delayed gel breaker may be utilized. A suitable delayed gel breaker may be present in the treatment fluid in an amount in the range of from about 0.01% to about 3% w/v, more preferably in an amount in the range of from about 0.05% to about 1% w/v.

In a reduced volatility gravel pack treatment fluid embodiment, a gelling agent comprising a polyvalent metal salt of a phosphoric acid ester may be added to the liquid hydrocarbon in an amount in the range of from about 0.1% to about 10% w/v with a portion of gravel particulates. Optionally, a gravel pack treatment fluid of the present invention may comprise water and or a base to achieve a desired gel. A method of the present invention of providing sand control to a subterranean formation comprises the steps of contacting a portion of the subterranean formation with a gelled liquid hydrocarbon gravel pack fluid of the present invention that comprises gravel and a gelling agent that comprises a polyvalent metal salt of a phosphoric acid ester so as to create a gravel pack neighboring that portion of the subterranean formation. In certain embodiments, the gelling agent may be present in the gelled liquid hydrocarbon gravel pack fluid in an amount in the range of from about 0.1% to about 5.0% w/v, more preferably in an amount in the range of from about 0.2% to about 2.5% w/v. In certain embodiments, the gravel particulates may be present in the fluid in an amount in the range of from about 1 to about 32 pounds of proppant particulates per gallon of liquid hydrocarbon, more preferably in the range of about 1 to about 22 pounds per gallon. As mentioned, if desired, water may be added, if not otherwise present in gelled liquid hydrocarbon gravel pack fluid, so that, e.g., a delayed gel breaker may be utilized. A suitable delayed gel breaker may be present in the gelled liquid hydrocarbon gravel pack fluid in an amount in the range of from about 0.01% to about 10% w/v, more preferably in an amount in the range of from about 0.05% to about 3% w/v.

Thus, the present invention is well adapted to carry out the objects and attain the benefits and advantages mentioned as well as those which are inherent therein. While numerous changes to the methods and compositions can be made by those skilled in the art, such changes are encompassed within the spirit of this invention as defined by the appended claims.

What is claimed is:

1. A method of treating a portion of a subterranean formation comprising:
    providing a reduced volatility gelled liquid hydrocarbon treatment fluid that comprises a liquid hydrocarbon and a gelling agent that comprises a polyvalent metal salt of a phosphoric acid ester wherein the reduced volatility gelled liquid hydrocarbon treatment fluid has a diester-to-monoester content molar ratio of at least about 2:1, and
    treating the portion of the subterranean formation with the reduced volatility gelled liquid hydrocarbon treatment fluid.

2. The method of claim 1 wherein the reduced volatility gelled liquid hydrocarbon treatment fluid has a concentration of less than about 100 mg/liter of trialkyl phosphate esters that have a molecular weight of less than about 350.

3. The method of claim 1 wherein the reduced volatility gelled liquid hydrocarbon treatment fluid has a concentration of less than about 50 mg/liter of trialkyl phosphate esters that have a molecular weight of less than about 350.

4. The method of claim 1 wherein the reduced volatility gelled liquid hydrocarbon treatment fluid comprises water and/or a base.

5. The method of claim 1 wherein the liquid hydrocarbon is selected from the group consisting of: an α-olefin, an internal olefin, an alkane, an aromatic solvent, a cycloalkane, liquefied petroleum gas, kerosene, diesel oil, gas oil, fuel oil, a petroleum distillate, a crude oil mixture, and a mixture thereof.

6. The method of claim 1 wherein the liquid hydrocarbon is designed for use with $CO_2$.

7. The method of claim 1 wherein the polyvalent metal salt of a phosphoric acid ester is formed from the reaction of an activator composition that comprises a source of polyvalent metal ions and a phosphoric acid ester, the phosphoric acid ester having the formula:

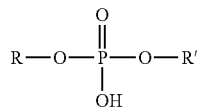

wherein R or R' comprises a hydrocarbon group having about 1 to about 30 carbon atoms; and R or R' comprises a hydrocarbon group having from about 1 to about 6 carbon atoms.

8. The method of claim 7 wherein the polyvalent metal ions are selected from the group consisting of: aluminum ions, gallium ions, lanthanum ions, ruthenium ions, iron ions, and lanthanide rare earth series ions.

9. The method of claim 7 wherein the polyvalent metal ions comprise ions having a +3 oxidation state.

10. The method of claim 7 wherein the activator composition is selected from the group consisting of: a ferric iron salt, aluminum chloride, sodium aluminate, and aluminum isopropoxide.

11. The method of claim 1 wherein the reduced volatility gelled liquid hydrocarbon treatment fluid comprises a surfactant.

12. The method of claim 11 wherein the surfactant is selected from the group consisting of: imidazoline, a fatty acid soap, a fatty acid, dioctyl sulphosuccinate, sodium alkyl benzene sulphonate, a fatty acid ester, a fatty acid alkanolamide, and an amido betaine.

13. The method of claim 11 wherein the surfactant is present in the reduced volatility gelled liquid hydrocarbon treatment fluid in an amount in the range of from about 0.1% to about 10% based on the gelling agent.

14. The method of claim 1 wherein the reduced volatility gelled liquid hydrocarbon treatment fluid comprises an enhancer.

15. The method of claim 14 wherein the enhancer provides at least some alkalinity to the reduced volatility gelled liquid hydrocarbon treatment fluid.

16. The method of claim 14 wherein the enhancer has the general formula $C_nH_mO_xN_y$, wherein n is from about 1 to about 50, m is from about 0 to about the number necessary to satisfy the valence of the enhancer, x is from about 1 to about 10, and y is from about 0 to about 10.

17. The method of claim 14 wherein the enhancer is selected from the group consisting of: an ethoxylated amine, triethanolamine, N,N-dibutyl ethanol amine, an oxyalkylated di-$C_2$–$C_8$-alkyl amine, N,N-di-loweralkyl fatty amine, an oxyalkylated fatty amine, monoammonium citrate, bis(hydroxyethyl)tallowamine, ethoxylated dehydroabietylamine, and a mixture thereof.

18. The method of claim 1 wherein treating the subterranean formation involves fracturing a portion of the subterranean formation.

19. The method of claim 18 wherein the reduced volatility gelled liquid hydrocarbon treatment fluid comprises proppant.

20. The method of claim 19 wherein the proppant is selected from the group consisting of nut shells, resin-coated nut shells, graded sand, resin-coated sand, sintered bauxite, particulate ceramic materials, glass beads, and particulate polymeric materials.

21. The method of claim 1 wherein treating the subterranean formation involves providing sand control to at least a portion of the subterranean formation.

22. The method of claim 21 wherein the reduced volatility gelled liquid hydrocarbon treatment fluid comprises gravel.

23. The method of claim 1 wherein the reduced volatility gelled liquid hydrocarbon treatment fluid comprises water, the water being present in an amount of at least about 0.05% by the total treatment fluid volume.

24. The method of claim 1 wherein the reduced volatility gelled liquid hydrocarbon treatment fluid further comprises a breaker, the breaker being present in an amount sufficient to reduce the viscosity of the reduced volatility gelled liquid hydrocarbon treatment fluid at a desired time.

25. The method of claim 24 wherein the breaker comprises a delayed gel breaker.

26. The method of claim 25 wherein the delayed gel breaker comprises an encapsulated delayed gel breaker.

27. The method of claim 25 wherein the delayed gel breaker is present in an amount in the range of from about 0.01% to about 3% w/v.

28. The method of claim 24 wherein the breaker is selected from the group consisting of: hard burned magnesium oxide, an alkali metal carbonate, alkali metal bicarbonate, alkali metal acetate, an alkaline earth metal oxides, an alkali metal hydroxide, an amine, and a weak acid.

29. The method of claim 24 wherein the breaker comprises a reducing agent that is capable of reducing ferric iron to ferrous iron.

30. The method of claim 29 wherein the reducing agent is selected from the group consisting of: stannous chloride, thioglycolic acid, hydrazine sulfate, sodium diethyldithiocarbamate, sodium dimethyldithiocarbamate, sodium hypophosphite, potassium iodide, hydroxylamine hydrochloride, 2-mercaptoethanol, ascorbic acid, sodium thiosulfate, sodium dithionite, and sodium sulfite.

31. The method of claim 24 wherein the breaker is present in an amount of 0.0 1% to about 3% of the volume of the treatment fluid.

32. The method of claim 1 wherein the treating the subterranean formation involves using the reduced volatility gelled liquid hydrocarbon treatment fluid to provide a plugging agent to a portion of the subterranean formation or a portion of a well bore penetrating the subterranean formation.

33. The method of claim 1 wherein treating the subterranean formation involves using the reduced volatility gelled liquid hydrocarbon treatment fluid as a well bore cleanup fluid.

34. The method of claim 1 wherein treating the subterranean formation involves using the reduced volatility gelled liquid hydrocarbon treatment fluid to perform a viscous sweep of a portion of the subterranean formation or a portion of a well bore penetrating the subterranean formation.

35. The method of claim 1 wherein treating the subterranean formation involves insulating a portion of the subterranean formation, a portion of a well bore penetrating the subterranean formation, or a tubing placed in a well bore penetrating the subterranean formation.

36. The method of claim 1 further comprising the step of preparing the reduced volatility gelled liquid hydrocarbon treatment fluid at the location of the subterranean formation.

37. The method of claim 1 further comprising the step of preparing the reduced volatility gelled liquid hydrocarbon treatment fluid at a location away from the subterranean formation and transporting the reduced volatility gelled liquid hydrocarbon treatment fluid to the subterranean formation.

38. A method of fracturing a portion of a subterranean formation comprising:
providing a reduced volatility gelled liquid hydrocarbon treatment fluid that comprises a liquid hydrocarbon and a gelling agent that comprises a polyvalent metal salt of a phosphoric acid ester wherein the reduced volatility gelled liquid hydrocarbon treatment fluid has a diester-to-monoester content molar ratio of at least about 2:1, and
contacting the portion of the subterranean formation with the gelled liquid hydrocarbon treatment fluid under conditions effective to create or enhance at least one fracture in the subterranean formation.

39. The method of claim 38 wherein the reduced volatility gelled liquid hydrocarbon treatment fluid has a concentration of less than about 100 mg/liter of trialkyl phosphate esters that have a molecular weight of less than about 350.

40. The method of claim 38 wherein the reduced volatility gelled liquid hydrocarbon treatment fluid has a concentration of less than about 50 mg/liter of trialkyl phosphate esters that have a molecular weight of less than about 350.

41. The method of claim 38 wherein the gelled liquid hydrocarbon treatment fluid comprises water and/or a base.

42. The method of claim 38 wherein the gelled liquid hydrocarbon treatment fluid is selected from the group consisting of: an α-olefin, an internal olefin, an alkane, an aromatic solvent, a cycloalkane, liquefied petroleum gas, kerosene, diesel oil, gas oil, fuel oil, a petroleum distillate, a crude oil mixture, and a mixture thereof.

43. The method of claim 38 wherein the polyvalent metal salt of a phosphoric acid ester is present in an amount in the range of from about 0.1% to about 10% w/v.

44. The method of claim 38 wherein the polyvalent metal salt of a phosphoric acid ester is present in an amount in the range of from about 0.1% to about 5% w/v.

45. The method of claim 38 wherein the polyvalent metal salt of a phosphoric acid ester is formed from the reaction of an activator composition that comprises a source of polyvalent metal ions and a phosphoric acid ester, the phosphoric acid ester having the formula:

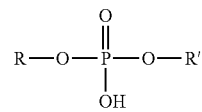

wherein R or R' comprises a hydrocarbon group having about 1 to about 30 carbon atoms; and R or R' comprises a hydrocarbon group having from about 1 to about 6 carbon atoms.

46. The method of claim 45 wherein the polyvalent metal ions comprise ions having a +3 oxidation state.

47. The method of claim 38 wherein the reduced volatility gelled liquid hydrocarbon treatment fluid comprises an enhancer.

48. The method of claim 47 wherein the enhancer has the general formula $C_nH_mO_xN_y$, wherein n is about 1 to about 50, m is about 0 to about the number necessary to satisfy the valence of the enhancer, x is about 1 to about 10, and y is about 0 to about 10.

49. The method of claim 38 wherein the reduced volatility gelled liquid hydrocarbon treatment fluid comprises a surfactant.

50. The method of claim 38 wherein the gelled liquid hydrocarbon treatment fluid comprises proppant.

51. The method of claim 50 wherein the proppant is present in an amount in the range of from about 1 to about 32 pounds of proppant per gallon of treatment fluid.

52. The method of claim 50 wherein the proppant is selected from the group consisting of: nut shells, resin coated nut shells, graded sand, resin coated sand, sintered bauxite, particulate ceramic materials, glass beads, and particulate polymeric materials.

53. The method of claim 38 wherein the gelled liquid hydrocarbon treatment fluid further comprises a breaker, the breaker being present in an amount sufficient to reduce the viscosity of the reduced volatility gelled liquid hydrocarbon treatment fluid at a desired time.

54. The method of claim 53 wherein the breaker is present in an amount of about 0.0 1% to about 3% w/v.

55. A method of providing sand control to a portion of a subterranean formation comprising:
providing a reduced volatility gelled liquid hydrocarbon treatment fluid that comprises gravel particulates and a gelling agent that comprises a polyvalent metal salt of a phosphoric acid ester wherein the reduced volatility gelled liquid hydrocarbon treatment fluid has a diester-to-monoester content molar ratio of at least about 2:1; and contacting the portion of the subterranean formation with the reduced volatility gelled liquid hydrocarbon treatment fluid so as to form a gravel pack near a portion of the subterranean formation.

56. The method of claim 55 wherein the reduced volatility gelled liquid hydrocarbon treatment fluid has a concentration of less than about 100 mg/liter of trialkyl phosphate esters that have a molecular weight of less than about 350.

57. The method of claim 55 wherein the reduced volatility gelled liquid hydrocarbon treatment fluid has concentration of less than about 50 mg/liter of trialkyl phosphate esters that have a molecular weight of less than about 350.

58. The method of claim 55 wherein the reduced volatility gelled liquid hydrocarbon treatment fluid comprises water and/or a base.

59. The method of claim 55 wherein the gelled reduced volatility gelled liquid hydrocarbon treatment fluid is selected from the group consisting of: an α-olefin, an internal olefin, an alkane, an aromatic solvent, a cycloalkane, liquefied petroleum gas, kerosene, diesel oil, gas oil, fuel oil, a petroleum distillate, a crude oil mixture, and a mixture thereof.

60. The method of claim 55 wherein the polyvalent metal salt of a phosphoric acid ester is present in an amount in the range of from about 0.1% to about 10% w/v.

61. The method of claim 55 wherein the polyvalent metal salt of a phosphoric acid ester is present in an amount in the range of from about 0.1% to about 5% w/v.

62. The method of claim 55 wherein the polyvalent metal salt of a phosphoric acid ester is formed from the reaction of an activator composition that comprises a source of polyvalent metal ions and a phosphoric acid ester, the phosphoric acid ester having the formula:

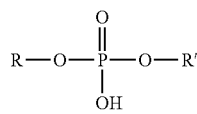

wherein R or R' comprises a hydrocarbon group having about 1 to about 30 carbon atoms; and R or R' comprises a hydrocarbon group having from about 1 to about 6 carbon atoms.

63. The method of claim 62 wherein the polyvalent metal ions comprise ions having a +3 oxidation state.

64. The method of claim 55 wherein the reduced volatility gelled liquid hydrocarbon treatment fluid comprises an enhancer.

65. The method of claim 64 wherein the enhancer has the general formula $C_nH_mO_xN_y$, wherein n is about 1 to about 50, m is about 0 to about the number necessary to satisfy the valence, x is about 1 to about 10, and y is about 0 to about 10.

66. The method of claim 55 wherein the reduced volatility gelled liquid hydrocarbon treatment fluid comprises a surfactant.

67. The method of claim 55 wherein the gravel is present in an amount in the range of from about 1 to about 32 pounds of gravel per gallon of treatment fluid.

68. The method of claim 55 wherein the reduced volatility gelled liquid hydrocarbon treatment fluid further comprises a breaker, the breaker being present in an amount sufficient to reduce the viscosity of the reduced volatility gelled liquid hydrocarbon treatment fluid at a desired time.

69. The method of claim 68 wherein the breaker is present in an amount of about 0.01% to about 3% w/v.

70. A method of treating a portion of a subterranean formation comprising:
providing a reduced volatility gelled liquid hydrocarbon treatment fluid that comprises a liquid hydrocarbon and a gelling agent, the gelling agent comprising a polyvalent metal salt of a phosphoric acid ester wherein the reduced volatility gelled liquid hydrocarbon treatment fluid has a concentration of less than about 100 mg/liter of trialkyl phosphate esters that have a molecular weight of less than about 350; and
treating the portion of the subterranean formation with the reduced volatility gelled liquid hydrocarbon treatment fluid.

71. The method of claim 70 wherein the reduced volatility gelled liquid hydrocarbon treatment fluid has a concentration of less than about 50 mg/liter of trialkyl phosphate esters that have a molecular weight of less than about 350.

72. The method of claim 70 wherein the reduced volatility gelled liquid hydrocarbon treatment fluid comprises water and/or a base.

73. The method of claim 70 wherein the liquid hydrocarbon is selected from the group consisting of: an α-olefin, an internal olefin, an alkane, an aromatic solvent, a cycloalkane, liquefied petroleum gas, kerosene, diesel oil, gas oil, fuel oil, a petroleum distillate, a crude oil mixture, and a mixture thereof.

74. The method of claim 70 wherein the liquid hydrocarbon is designed for use with $CO_2$.

75. The method of claim 70 wherein the polyvalent metal salt of a phosphoric acid ester is formed from the reaction of an activator composition that comprises a source of polyvalent metal ions and a phosphoric acid ester, the phosphoric acid ester having the formula:

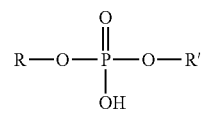

wherein R or R' comprises a hydrocarbon group having about 1 to about 30 carbon atoms; and R or R' comprises a hydrocarbon group having from about 1 to about 6 carbon atoms.

76. The method of claim 75 wherein the polyvalent metal ions are selected from the group consisting of: aluminum ions, gallium ions, lanthanum ions, ruthenium ions, iron ions, and lanthanide rare earth series ions.

77. The method of claim 75 wherein the polyvalent metal ions comprise ions having a +3 oxidation state.

78. The method of claim 75 wherein the activator composition is selected from the group consisting of: a ferric iron salt, aluminum chloride, sodium aluminate, and aluminum isopropoxide.

79. The method of claim 70 wherein the reduced volatility gelled liquid hydrocarbon treatment fluid comprises a surfactant.

80. The method of claim 79 wherein the surfactant is selected from the group consisting of: imidazoline, a fatty acid soap, a fatty acid, dioctyl sulphosuccinate, sodium alkyl benzene sulphonate, a fatty acid ester, a fatty acid alkanolamide, and an amido betaine.

81. The method of claim 79 wherein the surfactant is present in the reduced volatility gelled liquid hydrocarbon treatment fluid in an amount in the range of from about 0.1% to about 10% based on the gelling agent.

82. The method of claim 70 wherein the reduced volatility gelled liquid hydrocarbon treatment fluid comprises an enhancer.

83. The method of claim 82 wherein the enhancer provides at least some alkalinity to the reduced volatility gelled liquid hydrocarbon treatment fluid.

84. The method of claim 82 wherein the enhancer has the general formula $C_nH_mO_xN_y$, wherein n is from about 1 to about 50, m is from about 0 to about the number necessary to satisfy the valence of the enhancer, x is from about 1 to about 10, and y is from about 0 to about 10.

85. The method of claim 82 wherein the enhancer is selected from the group consisting of: an ethoxylated amine, triethanolamine, N,N-dibutyl ethanol amine, an oxyalkylated di-$C_2$–$C_8$-alkyl amine, N,N-di-loweralkyl fatty amine, an oxyalkylated fatty amine, monoammonium citrate, bis(hydroxyethyl)tallowamine, ethoxylated dehydroabietylamine, and a mixture thereof.

86. The method of claim 70 wherein treating the subterranean formation involves fracturing a portion of the subterranean formation.

87. The method of claim 86 wherein the reduced volatility gelled liquid hydrocarbon treatment fluid comprises a proppant.

88. The method of claim 87 wherein the proppant is selected from the group consisting of nut shells, resin-coated nut shells, graded sand, resin-coated sand, sintered bauxite, particulate ceramic materials, glass beads, and particulate polymeric materials.

89. The method of claim 70 wherein treating the subterranean formation involves providing sand control to at least a portion of the subterranean formation.

90. The method of claim 89 wherein the reduced volatility gelled liquid hydrocarbon treatment fluid comprises gravel.

91. The method of claim 90 wherein the gravel is selected from the group consisting of nut shells, resin-coated nut shells, graded sand, resin-coated sand, sintered bauxite, particulate ceramic materials, glass beads, and particulate polymeric materials.

92. The method of claim 70 wherein the reduced volatility gelled liquid hydrocarbon treatment fluid comprises water, the water being present in an amount of at least about 0.05% by the total treatment fluid volume.

93. The method of claim 70 wherein the reduced volatility gelled liquid hydrocarbon treatment fluid further comprises a breaker, the breaker being present in an amount sufficient to reduce the viscosity of the reduced volatility gelled liquid hydrocarbon treatment fluid at a desired time.

94. The method of claim 93 wherein the breaker comprises a delayed gel breaker.

95. The method of claim 94 wherein the delayed gel breaker comprises an encapsulated delayed gel breaker.

96. The method of claim 94 wherein the delayed gel breaker is present in an amount in the range of from about 0.0 1% to about 3% w/v.

97. The method of claim 93 wherein the breaker is selected from the group consisting of: a hard burned magnesium oxide, an alkali metal carbonate, an alkali metal bicarbonate, an alkali metal acetate, an alkaline earth metal oxides, an alkali metal hydroxide, an amine, and a weak acid.

98. The method of claim 93 wherein the breaker comprises a reducing agent that is capable of reducing ferric iron to ferrous iron.

99. The method of claim 98 wherein the reducing agent is selected from the group consisting of: stannous chloride, thioglycolic acid, hydrazine sulfate, sodium diethyldithiocarbamate, sodium dimethyldithiocarbamate, sodium hypophosphite, potassium iodide, hydroxylamine hydrochloride, 2-mercaptoethanol, ascorbic acid, sodium thiosulfate, sodium dithionite, and sodium sulfite.

100. The method of claim 93 wherein the breaker is present in an amount of 0.01% to about 3% of the volume of the treatment fluid.

101. The method of claim 70 wherein the treating the subterranean formation involves using the reduced volatility gelled liquid hydrocarbon treatment fluid to provide a plugging agent to a portion of the subterranean formation.

102. The method of claim 70 wherein treating the subterranean formation involves using the reduced volatility gelled liquid hydrocarbon treatment fluid as a well bore cleanup fluid.

103. The method of claim 70 wherein treating the subterranean formation involves using the reduced volatility gelled liquid hydrocarbon treatment fluid to perform a viscous sweep of a portion of the subterranean formation or a portion of a well bore penetrating the subterranean formation.

104. The method of claim 70 wherein treating the subterranean formation involves insulating a portion of the subterranean formation, a portion of a well bore penetrating the subterranean formation, or a tubing placed in a well bore penetrating the subterranean formation.

105. The method of claim 70 further comprising the step of preparing the reduced volatility gelled liquid hydrocarbon treatment fluid at the location of the subterranean formation.

106. The method of claim 70 further comprising the step of preparing the reduced volatility gelled liquid hydrocarbon treatment fluid at a location away from the subterranean formation and transporting the reduced volatility gelled liquid hydrocarbon treatment fluid to the subterranean formation.

* * * * *